(12) United States Patent
Kano et al.

(10) Patent No.: US 8,726,695 B2
(45) Date of Patent: May 20, 2014

(54) MANUFACTURING APPARATUS FOR A THIN GLASS SHEET

(75) Inventors: Tomonori Kano, Otsu (JP); Noritomo Nishiura, Otsu (JP); Koki Ueda, Otsu (JP); Takahide Nakamura, Otsu (JP); Daisuke Nagata, Otsu (JP); Hidetaka Oda, Otsu (JP); Yuji Iwama, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 89 days.

(21) Appl. No.: 13/429,548

(22) Filed: Mar. 26, 2012

(65) Prior Publication Data
US 2012/0272688 A1    Nov. 1, 2012

(30) Foreign Application Priority Data

Apr. 1, 2011    (JP) ................. 2011-081961

(51) Int. Cl.
*C03B 18/06*    (2006.01)
*C03B 17/06*    (2006.01)

(52) U.S. Cl.
CPC ............... *C03B 18/06* (2013.01); *C03B 17/064* (2013.01)
USPC ............................ 65/91; 65/92; 65/93; 65/90

(58) Field of Classification Search
CPC ........ C03B 18/02; C03B 18/04; C03B 18/06; C03B 15/02; C03B 15/04; C03B 17/064
USPC ..................................... 65/90–101
See application file for complete search history.

(56) References Cited

U.S. PATENT DOCUMENTS

| | | | | |
|---|---|---|---|---|
| 3,451,798 A | * | 6/1969 | Simon | ............................ 65/199 |
| 3,537,834 A | * | 11/1970 | Simon | ............................ 65/199 |
| 6,472,031 B1 | * | 10/2002 | Daecher et al. | ................ 428/1.1 |

(Continued)

FOREIGN PATENT DOCUMENTS

| | | |
|---|---|---|
| JP | 63-151633 | 6/1988 |
| JP | 2008-526671 | 7/2008 |

(Continued)

OTHER PUBLICATIONS

International Search Report issued Jun. 26, 2012 in corresponding International (PCT) Application No. PCT/JP2012/057683.

(Continued)

*Primary Examiner* — Jodi C Franklin
(74) *Attorney, Agent, or Firm* — Wenderoth, Lind & Ponack, L.L.P.

(57) ABSTRACT

A manufacturing apparatus for a thin glass sheet includes a forming member main body configured to form the thin glass sheet by fusing together, at a lower end portion of the forming member main body, streams of molten glass, which have overflown from an overflow trough to both sides of the forming member main body, under a state in which the streams of the molten glass are caused to flow down along outer surface portions having a substantially wedge shape. The manufacturing apparatus also includes a pair of covering members fitted onto both widthwise end portions of the forming member main body, respectively, the pair of covering members forming restricting wall portions for restricting widthwise spread of the streams of the molten glass flowing down along the outer surface portions of the forming member main body.

21 Claims, 7 Drawing Sheets

(56) References Cited

U.S. PATENT DOCUMENTS

| | | | |
|---|---|---|---|
| 7,409,839 B2* | 8/2008 | Boratav et al. | 65/199 |
| 7,685,841 B2* | 3/2010 | Boratav et al. | 65/93 |
| 7,748,236 B2* | 7/2010 | Pitbladdo | 65/193 |
| 8,176,753 B2* | 5/2012 | Kahlout et al. | 65/90 |
| 8,230,699 B2* | 7/2012 | Pitbladdo | 65/53 |
| 2006/0236722 A1* | 10/2006 | Delia et al. | 65/90 |
| 2006/0242994 A1* | 11/2006 | Boratav et al. | 65/90 |
| 2008/0264104 A1* | 10/2008 | Boratav et al. | 65/90 |
| 2009/0131241 A1* | 5/2009 | Godard et al. | 501/106 |
| 2010/0251774 A1* | 10/2010 | Peterson | 65/193 |
| 2012/0111060 A1 | 5/2012 | Tsuda et al. | |
| 2012/0125048 A1 | 5/2012 | Godard et al. | |

FOREIGN PATENT DOCUMENTS

| | | |
|---|---|---|
| JP | 2008-539159 | 11/2008 |
| WO | 2006/073841 | 7/2006 |
| WO | 2006/115792 | 11/2006 |
| WO | 2011/007681 | 1/2011 |

OTHER PUBLICATIONS

International Preliminary Report on Patentability and Written Opinion issued Oct. 17, 2013 in International Application No. PCT/JP2012/057683.

* cited by examiner

MANUFACTURING APPARATUS FOR A THIN GLASS SHEET

TECHNICAL FIELD

The present invention relates to an improvement in a technology for manufacturing a thin glass sheet by an overflow downdraw method.

BACKGROUND ART

As is well known, as represented by a glass substrate for a flat panel display (FPD) such as a liquid crystal display, a plasma display, or an organic light-emitting diode (OLED) display, thin glass sheets utilized in various fields are actually required to satisfy a rigorous product quality requirement for surface defects and waviness.

As a manufacturing method for a thin glass sheet of this kind, an overflow downdraw method may be utilized, which is capable of obtaining a glass surface which is smooth and free of defects.

As illustrated in FIG. 5, this manufacturing method includes: pouring molten glass G into an overflow trough 4 formed in a top portion of a forming member 1; allowing the molten glass G which is overflown to both sides from the overflow trough 4 to flow down along outer surface portions 5 (each including a perpendicular surface portion 5a and an inclined surface portion 5b) of the forming member 1, which have a substantially wedge shape; and fusing together streams of the molten glass at a lower end portion 5c of the forming member 1, thereby continuously forming a single thin glass sheet. This manufacturing method is characterized in that both front and back surfaces of the thin glass sheet are formed in a forming process without coming into contact with any area of the forming member 1, and hence a fire polished surface with extremely high flatness and smoothness and without defects such as flaws can be obtained.

Specifically, the forming member 1 to be used for this manufacturing method includes, for example, restricting wall portions 3b for restricting widthwise spread of the molten glass G flowing down along the outer surface portions 5 of a forming member main body 2 (see, for example, Patent Literature 1 and Patent Literature 2). In this case, both widthwise end portions of the molten glass G overflown from the overflow trough 4 are guided downward along the restricting wall portions 3b at a stage at which the molten glass G has reached the outer surface portions 5 of the forming member main body 2. As illustrated in FIG. 6, the restricting wall portions 3b are generally formed by fitting a pair of covering members 3 (specifically, fitting depressions 3a) onto both widthwise end portions of the forming member main body 2. To give an additional description, end surfaces of the covering members 3 fitted onto both the widthwise end portions of the forming member main body 2 serve as the restricting wall portions 3b.

CITATION LIST

Patent Literature

Patent Literature 1: JP 2008-526671 A
Patent Literature 2: JP 2008-539159 A

SUMMARY OF INVENTION

Technical Problems

However, in the case of the forming member 1 having the structure in which the covering members 3 are fitted onto the forming member main body 2, as illustrated in FIG. 7, the molten glass G overflown from the overflow trough 4 may enter a space between the forming member main body 2 and the covering member 3 in the process of flowing down along the restricting wall portions 3b. This is because temperatures of both the forming member main body 2 and the covering member 3 become high in the process of forming the thin glass sheet and a clearance is inevitably generated between the forming member main body 2 and the covering member 3 due to a difference in coefficient of thermal expansion. Further, molten glass (hereinafter, referred to as "sidestream molten glass") Gx, which has entered the clearance between the forming member main body 2 and the covering member 3 from, for example, the direction B of FIG. 7, passes through the clearance and outflows at the lower end portion 5c of the forming member main body 2 along the restricting wall portions 3b.

On the other hand, as indicated by the arrows A of FIG. 7, molten glass (hereinafter, referred to as "mainstream molten glass") Ga, which is normally flowing down along the outer surface portions 5 of the forming member main body 2, gradually contracts in the width direction toward the lower end portion 5c of the forming member main body 2, and separates from the restricting wall portions 3b at the lower portion of the forming member main body 2. Therefore, at the lower end portion of the forming member main body 2, the mainstream molten glass Ga and the sidestream molten glass Gx do not join each other, and the sidestream molten glass Gx solely flows down into a streak from the lower end portion 5c of the forming member main body 2. As a result, along with the lapse of time, the sidestream molten glass Gx forms a mass of droplet at a position immediately below the lower end portion 5c of the forming member main body 2, and falls as a glass droplet Gx1 when the droplet has become large enough. When the glass droplet Gx1 falls in this manner, various adverse effects are imposed on the process of forming the thin glass sheet from the mainstream molten glass Ga. That is, the fallen glass droplet Gx1 may collide with drawing rollers or the like when falling, and shatter so that glass particles are generated. As a result, the thin glass sheet may be contaminated. Further, the fallen glass droplet Gx1 may, for example, collide with the thin glass sheet, and as a result, there may occur such a serious trouble that the thin glass sheet is damaged.

In view of the above-mentioned circumstances, it is a technical object of the present invention to reliably prevent a situation in which a thin glass sheet to be formed suffers a trouble, such as damage thereto, due to sidestream molten glass separated from mainstream molten glass when forming the thin glass sheet by an overflow downdraw method.

Solution to Problems

According to the present invention which has been made in order to solve the above-mentioned problems, there is provided a manufacturing apparatus for a thin glass sheet, the manufacturing apparatus comprising a forming member comprising: a forming member main body comprising an overflow trough formed in a top portion thereof, the forming member main body being configured to form the thin glass sheet by fusing together, at a lower end portion of the forming member main body, streams of molten glass, which have overflown from the overflow trough to both sides of the forming member main body, under a state in which the streams of the molten glass are caused to flow down along outer surface portions having a substantially wedge shape; and a pair of covering members fitted onto both widthwise end portions of the forming member main body, respectively, the pair of covering members forming restricting wall portions for restricting widthwise spread of the streams of the molten glass flowing down along the outer surface portions of the forming member main body, in which the restricting wall portions of the pair of covering members each comprise an extending portion extending toward a widthwise central portion while covering a lower region including the lower end portion of the forming member main body from its below, and in which a distal end portion of the extending portion is directed to a flow-down area of streams of mainstream molten glass normally flowing down along the outer surface portions of the forming member main body.

With this structure, in the lower region including the lower end portion of the forming member main body, the extending portion guides, to the widthwise central side, the sidestream molten glass that has entered the clearance formed between the covering member and the forming member main body. As a result, the sidestream molten glass can be caused to join the mainstream molten glass flowing down along each outer surface portion of the forming member main body. Thus, the sidestream molten glass does not solely flow down from the lower end portion of the forming member main body, and it is accordingly possible to reliably prevent the situation in which the glass droplet is formed due to the sidestream molten glass.

In the above-mentioned structure, it is preferred that the extending portion extend toward the lower end portion of the forming member main body so as to gradually approach in a direction from the widthwise end portion toward a widthwise center.

With this structure, the shape of the extending portion changes along with the widthwise contraction of the mainstream molten glass, and hence it is possible to reduce resistance to be imparted from the extending portion onto the streams of the mainstream molten glass.

In the above-mentioned structure, the extending portion may be formed of a thin member provided along each of the outer surface portions of the forming member main body so that the mainstream molten glass is receivable on a surface of the extending portion.

With this structure, the mainstream molten glass can be received on the extending portion, and hence the widthwise contraction of the mainstream molten glass can be minimized. In other words, the widthwise dimension of the thin glass sheet to be formed can be maintained.

In this case, it is preferred that the extending portion comprise unevenness on the surface thereof.

With this structure, the widthwise contraction of the mainstream molten glass can be suppressed more reliably due to the unevenness of the surface of the extending portion. Note that, when wettability between the mainstream molten glass and the surface of the extending portion is satisfactory, the surface of the extending portion may be smooth.

In the above-mentioned structure, the extending portion may be formed of a thick member capable of restricting the widthwise spread of the mainstream molten glass at the distal end portion of the extending portion.

With this structure, the distal end portion of the extending portion functions as the restricting wall portion for restricting the widthwise spread of the mainstream molten glass. Therefore, the extending portion regulates the widthwise spread of the mainstream molten glass, and in this state, the sidestream molten glass outflowing from the distal end portion of the extending portion can be caused to reliably join the mainstream molten glass. Note that, the extending portion may have, at the distal end portion thereof, a flange portion provided upright substantially perpendicularly to the surface of the forming member main body. With this structure, even when the extending portion is formed of the thin member, it is possible to obtain an effect similar to the above-mentioned effect obtained in the case where the extending portion is formed of the thick member.

In the above-mentioned structure, the extending portion may be made of heat-resistant and corrosion-resistant metals, an alloy thereof, or a composite material thereof.

With this structure, mechanical deformation of the extending portion and damage to the extending portion due to chemical corrosion can be reduced, and hence the sidestream molten glass can be caused to stably join the mainstream molten glass.

In the above-mentioned structure, it is preferred that a maximum widthwise extension amount of the extending portion be 10 mm to 200 mm.

That is, when the maximum widthwise extension amount is less than 10 mm, the distance of guiding to the widthwise central side by the extending portion becomes extremely small, and hence there is a risk that the sidestream molten glass is hard to join the mainstream molten glass. On the other hand, when the maximum widthwise extension amount exceeds 200 mm, resistance to be imparted from the stream of the mainstream molten glass becomes extremely large, and hence there is a risk that the extending portion is deformed. Thus, to avoid those problems, it is preferred that the maximum widthwise extension amount of the extending portion fall within the above-mentioned numerical range.

In the above-mentioned structure, it is preferred that a heightwise extension start position of the extending portion be spaced apart from the lower end portion of the forming member main body by 30 mm or more upward along the outer surface portions of the forming member main body.

With this structure, the extending portion can reliably be situated at the widthwise contraction start position of the mainstream molten glass.

Advantageous Effects of Invention

As described above, according to the present invention, in the lower region including the lower end portion of the forming member main body, the extending portion guides, to the widthwise central side, the sidestream molten glass that has entered the clearance formed between the covering member and the forming member main body. As a result, the sidestream molten glass can be caused to join the mainstream molten glass flowing down along each outer surface portion of the forming member main body. Thus, it is possible to reliably prevent the situation in which the sidestream molten glass solely flows down from the lower end portion of the forming member main body to form the glass droplet. Thus, it is possible to reliably prevent the situation in which the thin glass sheet to be formed suffers a trouble, such as damage thereto, due to the sidestream molten glass separated from the mainstream molten glass.

DESCRIPTION OF EMBODIMENTS

Hereinafter, embodiments of the present invention are described with reference to the accompanying drawings.

Figure 1:
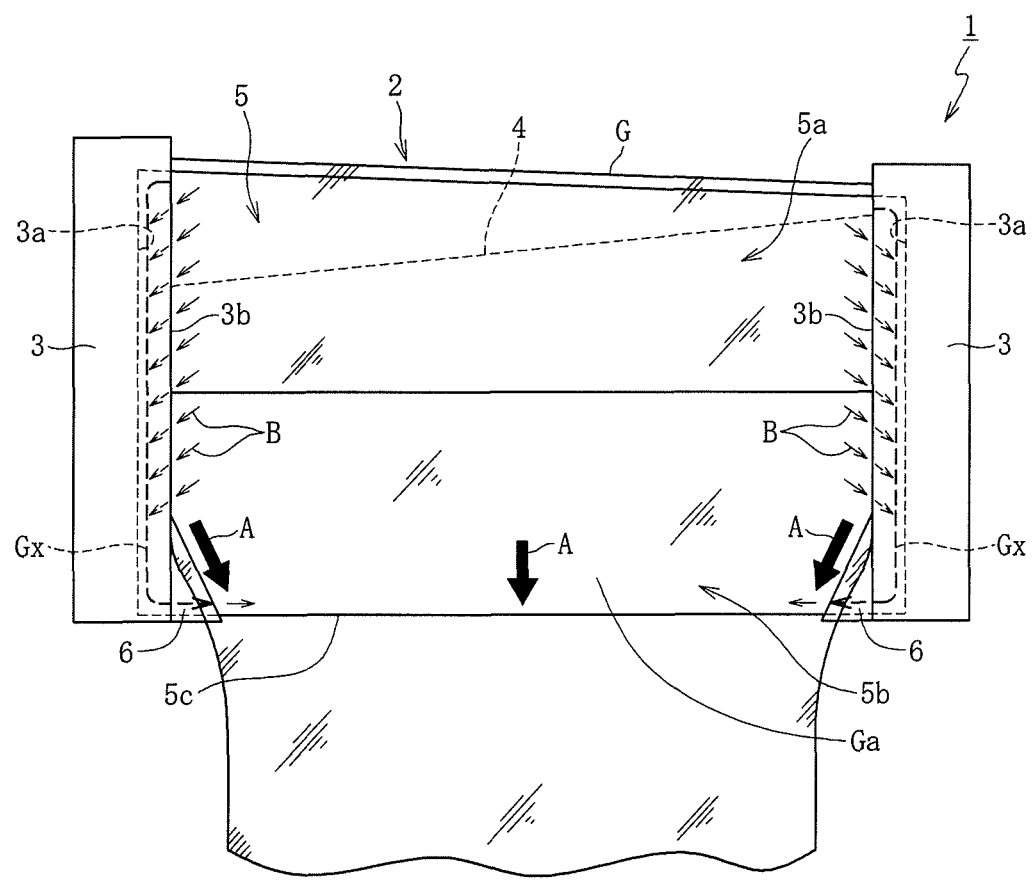
FIG. 1 A front view illustrating the vicinity of a forming member of a manufacturing apparatus for a thin glass sheet according to a first embodiment of the present invention.

FIG. 1 is a front view illustrating a main part of a manufacturing apparatus for a thin glass sheet according to a first embodiment of the present invention. Note that, components corresponding to the components described in the "Background Art" section are represented by the same reference symbols for description. The manufacturing apparatus for a thin glass sheet comprises a forming member 1 for executing an overflow downdraw method.

The forming member 1 comprises a forming member main body 2, and a pair of covering members 3 fitted onto both widthwise end portions of the forming member main body 2, respectively.

The forming member main body 2 is elongated along a direction corresponding to a width direction of a thin glass sheet to be manufactured, and comprises an overflow trough 4 formed in a top portion of the forming member main body 2 along a longitudinal direction thereof, and a pair of outer surface portions 5 gradually approaching each other downward to have a substantially wedge shape.

Molten glass G is fed into the overflow trough 4 formed in the top portion of the forming member main body 2. Mainstream molten glass Ga, which is part of streams of the molten glass G that have overflown to both sides, flows down along both the outer surface portions 5 of the forming member main body 2, which have a substantially wedge shape. Streams of the mainstream molten glass Ga flowing down along both the outer surface portions 5 of the forming member main body 2 are fused together at part of a lower end portion of the forming member main body 2, which is called a root, and a single thin glass sheet is continuously formed from the mainstream molten glass Ga. Note that, the fused mainstream molten glass Ga is delivered downward under a state in which both widthwise end portions thereof are sandwiched from both front and back sides by drawing rollers (not shown) or the like below the forming member 1.

The outer surface portions 5 of the forming member main body 2 are each formed of a perpendicular surface portion 5a and an inclined surface portion 5b, which are connected to each other in a vertical direction, and the respective inclined surface portions 5b form, at an intersection point thereof, a lower end portion 5c of the forming member main body 2, which is called the root as described above.

Figure 5:
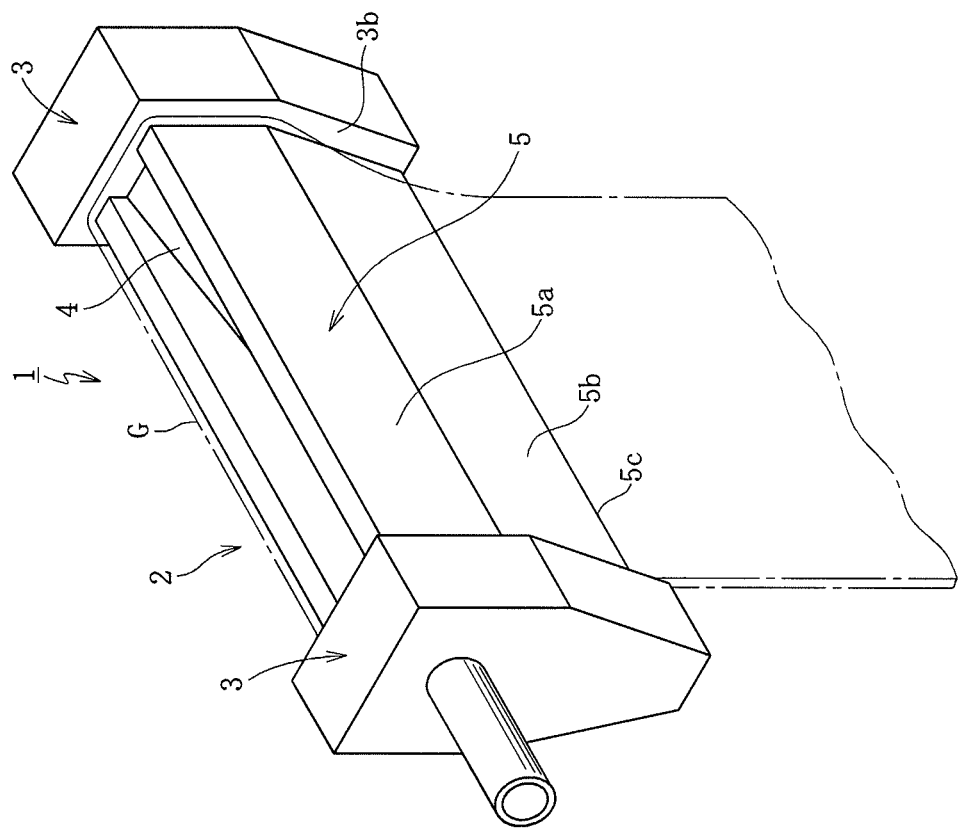
FIG. 5 A perspective view illustrating the vicinity of a forming member of a conventional manufacturing apparatus for a thin glass sheet.
Figure 6:
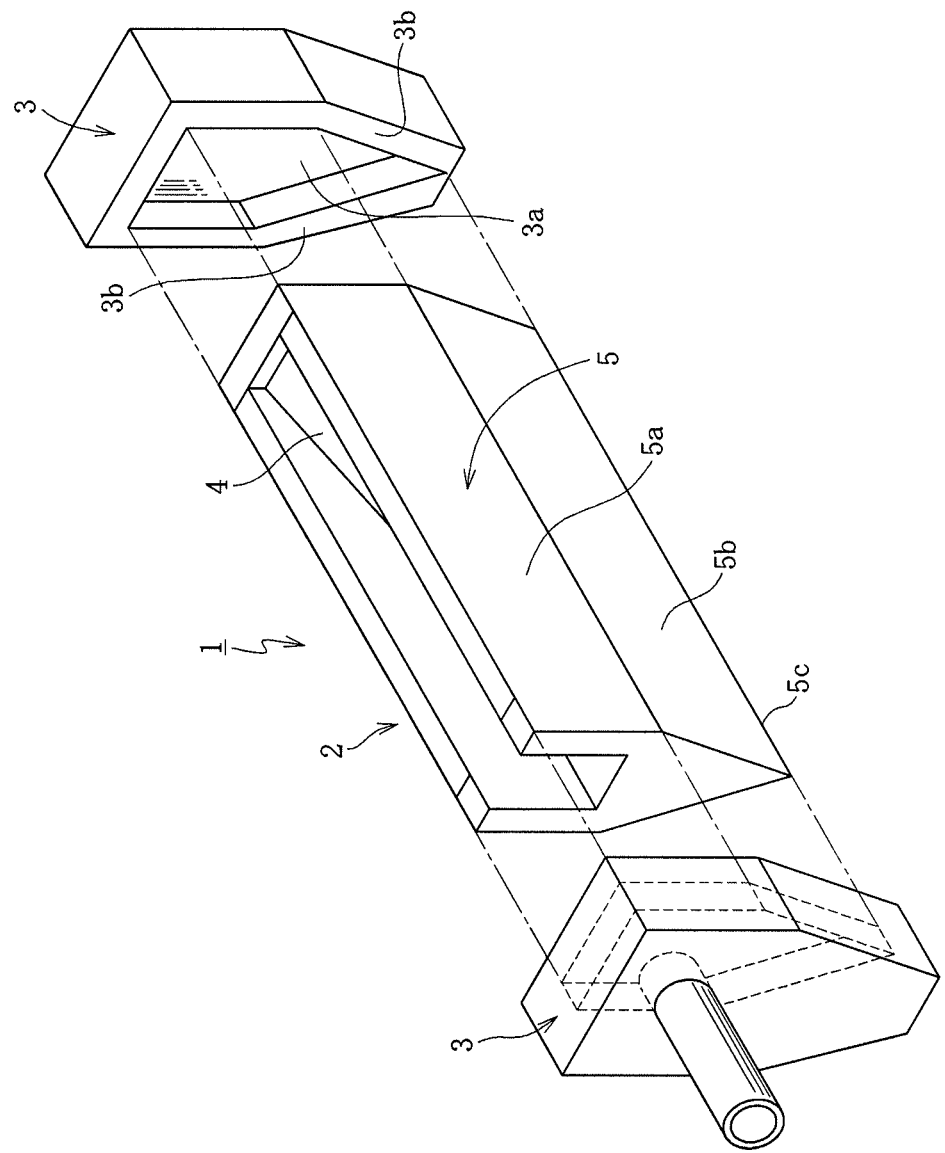
FIG. 6 An exploded perspective view of the conventional forming member.

On the other hand, the covering members 3 comprise fitting depressions 3a to be fitted onto both the widthwise end portions of the forming member main body 2, respectively (specifically, see FIG. 5). Under a state in which the fitting depressions 3a of the covering members 3 are fitted onto the forming member main body 2, the covering members 3 cover both the widthwise end portions of the forming member main body 2, respectively, and form restricting wall portions 3b for restricting widthwise spread of the streams of the molten glass G flowing down along the outer surface portions 5 of the forming member main body 2. Note that, the restricting wall portions 3b each have a thickness of, for example, 1 mm to 10 mm.

Further, as a constituent feature of this embodiment, the restricting wall portions 3b of the covering members 3 each comprise an extending portion 6 extending toward a widthwise central portion while covering a lower region including the lower end portion 5c of the forming member main body 2 from below. Further, a distal end portion of the extending portion 6 is directed to a flow-down area of streams of the mainstream molten glass Ga (streams indicated by the arrow A of FIG. 1) normally flowing down along the outer surface portions 5 of the forming member main body 2. Therefore, the distal end portion of the extending portion 6 overlaps with the flow-down area of the mainstream molten glass Ga. The overlapping portion between the extending portion 6 and the flow-down area of the mainstream molten glass Ga may at least be formed at the lower end portion 5c of the forming member main body 2.

Figure 2:
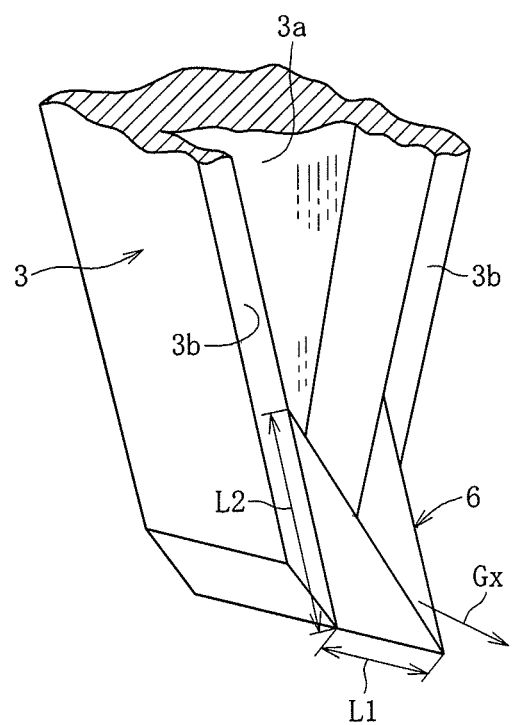
FIG. 2 An enlarged perspective view illustrating an extending portion of FIG. 1.

Specifically, as illustrated in FIG. 2, in this embodiment, the extending portion 6 is formed of a thin member (that is thin in a range smaller than the thickness of the restricting wall portion 3b of the covering member 3, and for example, has a thickness of 0.5 mm to 3 mm) provided along each outer surface portion 5 of the forming member main body 2, and extends toward the lower end portion of the forming member main body 2 so as to gradually approach in a direction from the widthwise end portion toward the widthwise center. In other words, the distal end portion of the extending portion 6 is inclined so that a lower side of the distal end portion of the extending portion 6 is situated on the widthwise central side relative to an upper side thereof. Therefore, the mainstream molten glass Ga is received on a surface of the extending portion 6. That is, part of the surface of the extending portion 6 serves as part of the flow-down area of the mainstream molten glass Ga.

Figure 7:
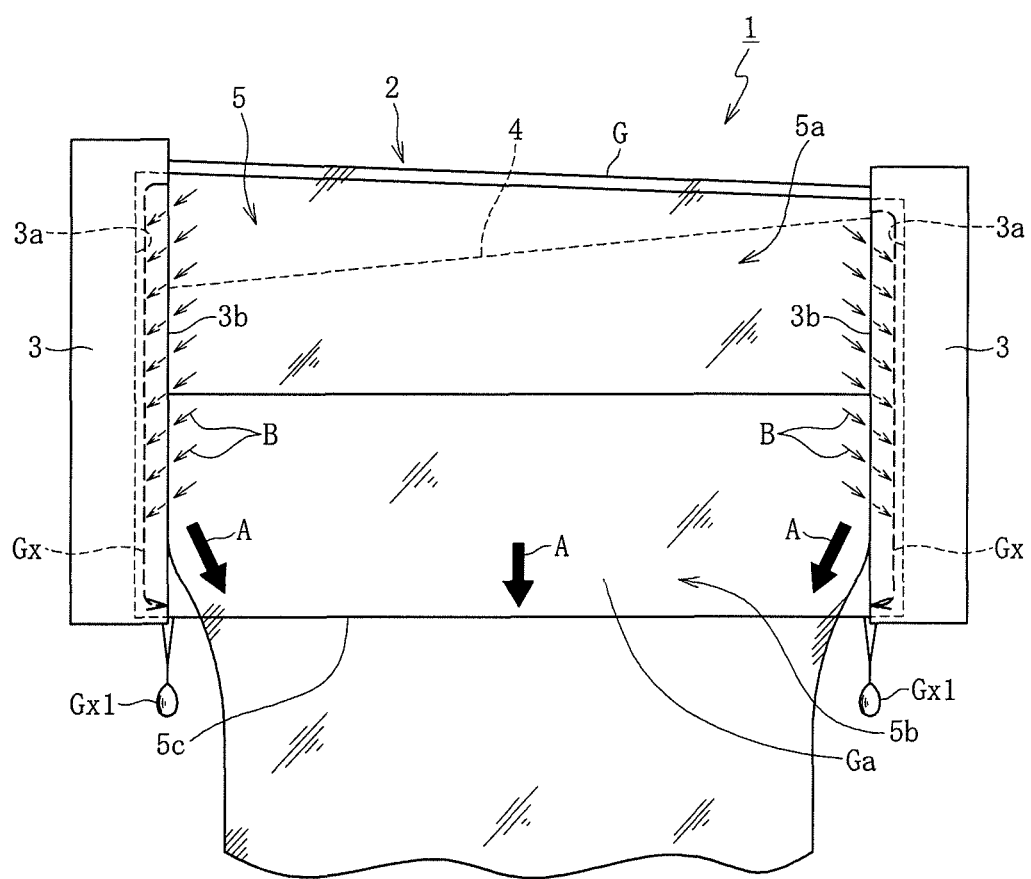
FIG. 7 An explanatory view illustrating problems with the conventional manufacturing apparatus for a thin glass sheet.

With the extending portion 6 provided to each covering member 3 as described above, in the lower region including the lower end portion 5c of the forming member main body 2, the extending portion 6 guides, to the widthwise central side, sidestream molten glass Gx that has entered a clearance, which is formed between the forming member main body 2 and the covering member 3 due to a difference in coefficient of thermal expansion between the covering member 3 and the forming member main body 2, from the arrow B direction of FIG. 1. As a result, the sidestream molten glass Gx can be caused to reliably join the mainstream molten glass Ga. Thus, the sidestream molten glass Gx does not solely flow down from the lower end portion of the forming member main body 2, and it is accordingly possible to reliably prevent the situation in which the glass droplet (see FIG. 7) is formed due to the sidestream molten glass Gx. Thus, it is possible to reliably prevent the situation in which the thin glass sheet to be formed suffers a serious problem, such as contamination and damage thereto, due to the sidestream molten glass Gx separated from the mainstream molten glass Ga, and to maintain stable manufacture of the thin glass sheet.

In this case, it is preferred that the surface of the extending portion 6, on which the mainstream molten glass Ga is to be received, comprise unevenness. Specifically, it is preferred that the surface of the extending portion 6 be held in such a surface state that, for example, depressions or projections each having a diameter of 1 mm to 2 mm and a depth or projecting height of 1 mm to 2 mm are interspersed at intervals of 2 mm to 3 mm. With this structure, adhesiveness between the mainstream molten glass Ga and the extending portion 6 is enhanced, with the result that the widthwise contraction of the mainstream molten glass Ga can be suppressed. Therefore, the widthwise dimension of the mainstream molten glass Ga can be maintained wider.

Further, the extending portion 6 is made of heat-resistant and corrosion-resistant metals, an alloy thereof, or a composite material thereof. Specifically, for example, the extending portion 6 is made of platinum, a platinum alloy, or a ceramic-dispersed composite material.

Further, a maximum widthwise dimension L1 of the extending portion 6 is preferably 10 mm to 200 mm, more preferably 20 mm to 180 mm, most preferably 30 mm to 160 mm. Further, a maximum heightwise dimension L2 of the extending portion 6 is preferably 30 mm or more, more preferably 30 mm or more and 400 mm or less, most preferably 30 mm or more and 200 mm or less. It is assumed that L1≤L2 is established.

Next, description is given of a manufacturing method for a thin glass sheet with the use of the manufacturing apparatus for a thin glass sheet structured as described above.

As illustrated in FIG. 1, first, the molten glass G is fed into the overflow trough 4 through a feed pipe (not shown), and the molten glass G is caused to overflow from the overflow trough 4 to both sides of the forming member main body 2. The mainstream molten glass Ga, which is part of the streams of the molten glass G that have overflown to both sides of the forming member main body 2, flows down along both the outer surface portions 5 under a state in which the widthwise spread is regulated by the restricting wall portions 3b of the covering members 3. The streams of the mainstream molten glass Ga are fused together at the lower end portion of the forming member main body 2. At this time, the sidestream molten glass Gx entering the clearance between the forming member main body 2 and the covering member 3 is generated separately from the mainstream molten glass Ga. The sidestream molten glass Gx is received by the extending portion 6 from below in the lower region including the lower end portion of the forming member main body 2 (in the example of FIG. 1, lower end portion of the forming member main body 2), and is guided to the widthwise central side along the extending portion 6 to join the mainstream molten glass Ga. Thus, the mainstream molten glass Ga and the sidestream molten glass Gx rejoin each other at the lower end portion of the forming member main body 2, and are then cooled in a state of being drawn down below the lower end portion of the forming member main body 2. As a result, the thin glass sheet is formed continuously.

Figure 3:
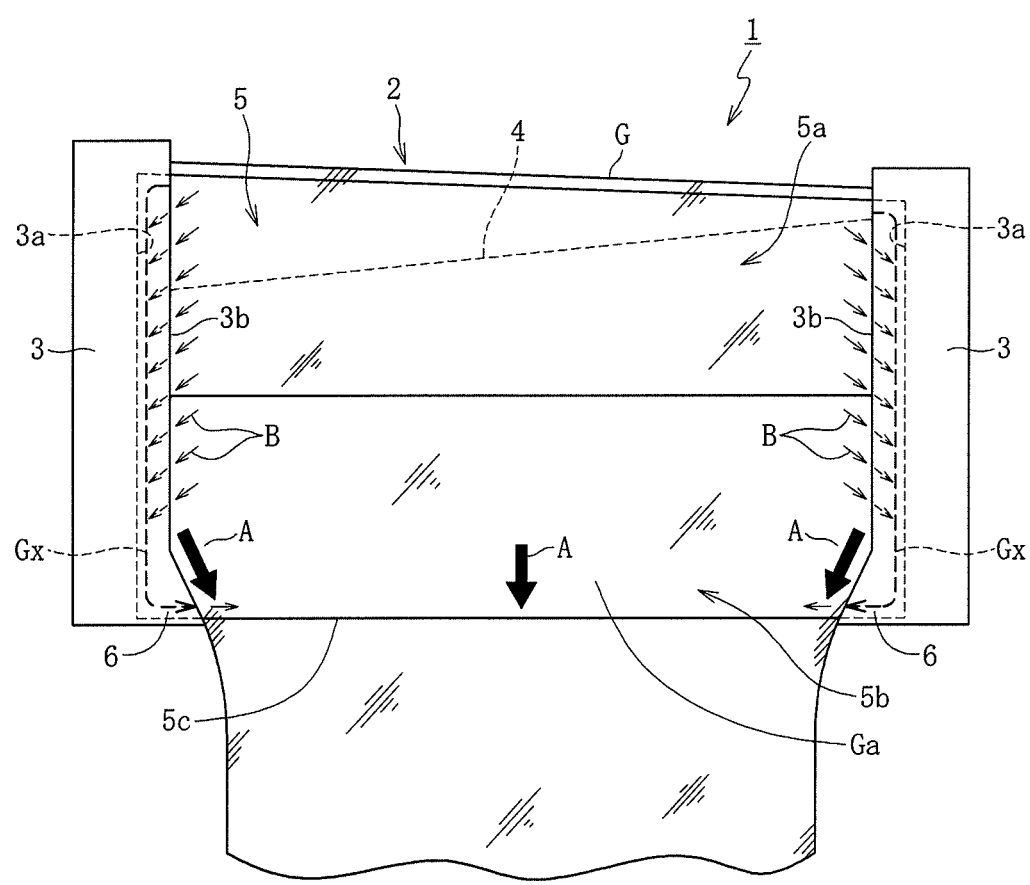
FIG. 3 A front view illustrating the vicinity of a forming member of a manufacturing apparatus for a thin glass sheet according to a second embodiment of the present invention.
Figure 4:
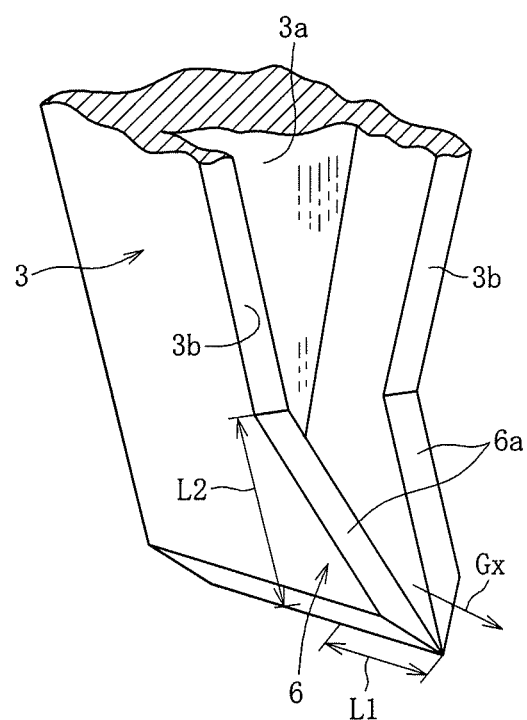
FIG. 4 An enlarged perspective view illustrating an extending portion of FIG. 3.

FIG. 3 is a front view illustrating a main part of a manufacturing apparatus for a thin glass sheet according to a second embodiment of the present invention. The manufacturing apparatus for a thin glass sheet according to the second embodiment is different from the manufacturing apparatus for a thin glass sheet according to the first embodiment in the structure of the extending portion 6 provided to each covering member 3.

That is, the second embodiment is different from the first embodiment in that the extending portion 6 is formed of a thick member capable of restricting the widthwise spread of the mainstream molten glass Ga at each distal edge 6a of the extending portion 6. With this structure, the distal end portion 6a of the extending portion 6 functions as the restricting wall portion for restricting the widthwise spread of the mainstream molten glass Ga. Therefore, the extending portion 6 regulates the widthwise spread of the mainstream molten glass Ga, and in this state, the sidestream molten glass Gx outflowing from the distal end of the extending portion 6 can be caused to reliably join the mainstream molten glass Ga.

The preferred ranges of the maximum widthwise dimension L1 of the extending portion 6 and the maximum heightwise dimension L2 of the extending portion 6 are similar to those in the above-mentioned first embodiment.

Note that, the present invention is not limited to the above-mentioned embodiments, and may be carried out by various embodiments. For example, in the above-mentioned embodiments, there has been described, through illustration, the case where the extending portion 6 covers the inclined surface portion 5b of each outer surface portion 5 of the forming member main body 5, but the extending portion 6 may continuously cover a region from the inclined surface 5b of each outer surface portion 5 to the perpendicular surface portion 5a thereof.

REFERENCE SIGNS LIST 1 forming member
2 forming member main body
3 covering member
3a fitting depression
3b restricting wall portion
4 overflow trough
5 outer surface portion
5a perpendicular surface portion
5b inclined surface portion
5c lower end portion
6 extending portion
G molten glass
Ga mainstream molten glass
Gx sidestream molten glass

The invention claimed is:

1. A manufacturing apparatus for a thin glass sheet, the manufacturing apparatus comprising a forming member comprising:
  a forming member main body comprising an overflow trough formed in a top portion thereof, the forming member main body being configured to form the thin glass sheet by fusing together, at a lower end portion of the forming member main body, streams of molten glass, which have overflown from the overflow trough to both sides of the forming member main body, under a state in which the streams of the molten glass are caused to flow down along outer surface portions of the forming member main body having a substantially wedge shape; and
  a pair of covering members, each of the covering members having a fitting depression into which a respective widthwise end portion of the forming member main body is fitted, and each of the pair of covering members including restricting wall portions and an extending portion,
  wherein the restricting wall portions restrict widthwise spread of the streams of the molten glass flowing down along the outer surface portions of the forming member main body,
  wherein each of the extending portions extends toward a widthwise central portion of the forming member main body and extends over a lower region of the forming member main body, including a part of the lower end portion of the forming member main body, with a clearance between the extending portion and the forming member main body, and
  wherein a distal end portion of each of the extending portions extends downstream beyond the lower end portion of the forming member main body.

2. The manufacturing apparatus for a thin glass sheet according to claim 1, wherein each of the extending portions extends closer to a widthwise center of the forming member main body in a downsteam direction.

3. The manufacturing apparatus for a thin glass sheet according to claim 1, wherein the extending portions are thinner than the restricting wall portions and are adjacent to the outer surface portions of the forming member main body so that mainstream molten glass is receivable on a surface of each of the extending portions.

4. The manufacturing apparatus for a thin glass sheet according to claim 3, wherein the surfaces of the extending portions are uneven.

5. The manufacturing apparatus for a thin glass sheet according to claim 1, wherein at least a section of each of the extending portions has a thickness that is the same as that of the restricting wall portions, the extending portions being capable of restricting the widthwise spread of the mainstream molten glass at the distal end portions of the extending portions.

6. The manufacturing apparatus for a thin glass sheet according to claim 1, wherein each of the extending portions is made of at least one heat-resistant and corrosion-resistant metal, an alloy thereof, or a composite material thereof.

7. The manufacturing apparatus for a thin glass sheet according to claim 1, wherein a maximum widthwise extension amount of each of the extending portions is 20 mm to 180 mm.

8. The manufacturing apparatus for a thin glass sheet according to claim 1, wherein a heightwise extension start position of each of the extending portions is spaced apart from the lower end portion of the forming member main body by 30 mm or more upstream along the outer surface portions of the forming member main body.

9. The manufacturing apparatus for a thin glass sheet according to claim 2, wherein the extending portions are thinner than the restricting wall portions and are adjacent to the outer surface portions of the forming member main body so that mainstream molten glass is receivable on a surface of each of the extending portions.

10. The manufacturing apparatus for a thin glass sheet according to claim 9, wherein the surfaces of the extending portions are uneven.

11. The manufacturing apparatus for a thin glass sheet according to claim 2, wherein at least a section of each of the extending portions has a thickness that is the same as that of the restricting wall portions, the extending portions being capable of restricting the widthwise spread of the mainstream molten glass at the distal end portions of the extending portions.

12. The manufacturing apparatus for a thin glass sheet according to claim 2, wherein each of the extending portions is made of at least one heat-resistant and corrosion-resistant metal, an alloy thereof, or a composite material thereof.

13. The manufacturing apparatus for a thin glass sheet according to claim 3, wherein each of the extending portions is made of at least one heat-resistant and corrosion-resistant metal, an alloy thereof, or a composite material thereof.

14. The manufacturing apparatus for a thin glass sheet according to claim 4, wherein each of the extending portions is made of at least one heat-resistant and corrosion-resistant metal, an alloy thereof, or a composite material thereof.

15. The manufacturing apparatus for a thin glass sheet according to claim 5, wherein the extending portion is made of heat-resistant and corrosion-resistant metals, an alloy thereof, or a composite material thereof.

16. The manufacturing apparatus for a thin glass sheet according to claim 9, wherein each of the extending portions is made of at least one heat-resistant and corrosion-resistant metal, an alloy thereof, or a composite material thereof.

17. The manufacturing apparatus for a thin glass sheet according to claim 10, wherein each of the extending portions is made of at least one heat-resistant and corrosion-resistant metal, an alloy thereof, or a composite material thereof.

18. The manufacturing apparatus for a thin glass sheet according to claim 11, wherein each of the extending portions is made of at least one heat-resistant and corrosion-resistant metal, an alloy thereof, or a composite material thereof.

19. The manufacturing apparatus for a thin glass sheet according to claim 2, wherein a maximum widthwise extension amount of each of the extending portions is 20 mm to 180 mm.

20. The manufacturing apparatus for a thin glass sheet according to claim 3, wherein a maximum widthwise extension amount of each of the extending portions is 20 mm to 180 mm.

21. The manufacturing apparatus for a thin glass sheet according to claim 1, wherein the extending portions are free from contact with the outer surface portions of the forming member main body.

\* \* \* \* \*